US 8,052,866 B2

Nov. 8, 2011

(12) United States Patent
Peng

(10) Patent No.: US 8,052,866 B2
(45) Date of Patent: Nov. 8, 2011

(54) MARINE WATER SEPARATING FUEL FILTER

(76) Inventor: I-Sin Peng, Taichung (TW)

( * ) Notice: Subject to any disclaimer, the term of this patent is extended or adjusted under 35 U.S.C. 154(b) by 0 days.

(21) Appl. No.: 12/200,511

(22) Filed: Aug. 28, 2008

(65) Prior Publication Data

US 2011/0100226 A1 May 5, 2011

(51) Int. Cl.
*B01D 27/08* (2006.01)
(52) U.S. Cl. .......... 210/94; 210/232; 210/313; 210/444; 210/454
(58) Field of Classification Search ............ 210/94, 210/232, 307, 313, 443, 444, 454; 55/421; 96/414, 416, 423
See application file for complete search history.

(56) References Cited

U.S. PATENT DOCUMENTS

| | | | | |
|---|---|---|---|---|
| 4,298,465 A | * | 11/1981 | Druffel | 210/444 |
| 5,182,015 A | * | 1/1993 | Lee | 210/444 |
| 5,259,953 A | * | 11/1993 | Baracchi et al. | 210/232 |
| 5,785,850 A | * | 7/1998 | Lynch et al. | 210/313 |
| 5,879,543 A | * | 3/1999 | Amini | 210/313 |
| 6,083,381 A | * | 7/2000 | Connelly et al. | 210/94 |
| 6,146,527 A | * | 11/2000 | Oelschlaegel | 210/443 |
| 6,287,464 B1 | * | 9/2001 | Gu | 210/443 |
| 6,793,818 B1 | * | 9/2004 | Entringer et al. | 210/443 |

\* cited by examiner

*Primary Examiner* — Christopher Upton
(74) *Attorney, Agent, or Firm* — Jackson IPG PLLC; Demian K. Jackson

(57) ABSTRACT

A marine water separating fuel filter includes a connecting tube head, an upper lid, a filter element, and a container. The filter element is accommodated in the container and sealed by the upper lid, with an axial inlet opening and a limiting ring provided on a hollow taper post to hold against the filter element. An axial pipe of the connecting tube head is screwed to the axial inlet opening. The connecting tube head has a pressing ring to hold against a washer, providing a sealing function. The unfiltered fuel from an inlet end is filtered with the filter element and then filtered fuel expelled through an outlet end. An indication ring is provided on the hollow taper post to indicate the height of liquid. This is an easy and quick way to assemble and disassemble the filter element, providing environmental and economical purposes.

2 Claims, 7 Drawing Sheets

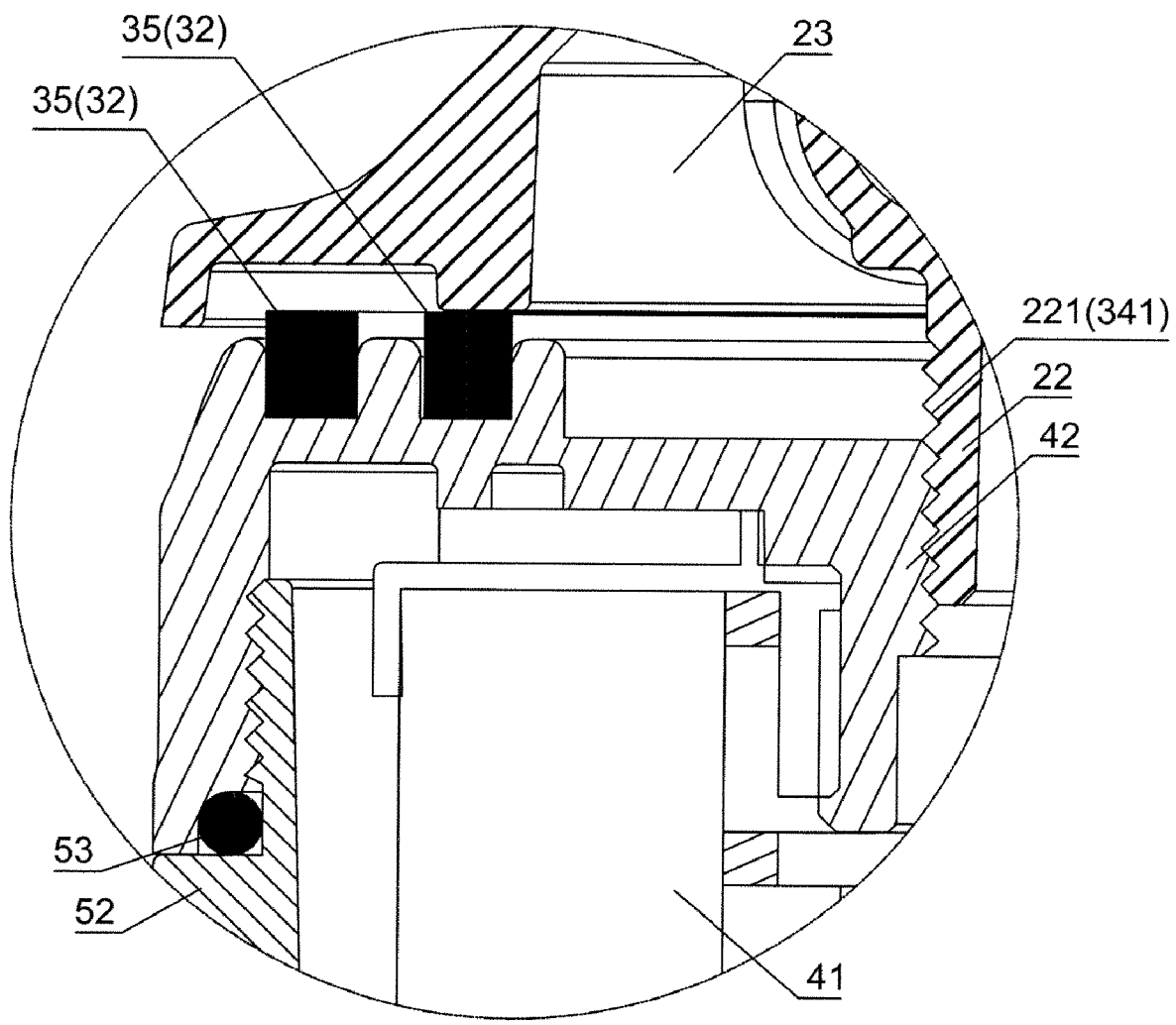
Fig. 3-A

Fig. 4-A

MARINE WATER SEPARATING FUEL FILTER

BACKGROUND OF THE INVENTION

1. Field of the Invention

The present invention relates to a marine water separating fuel filter, and more particularly to one having a filter element accommodated in a container and sealed by an upper lid, with an axial inlet opening and a limiting ring provided on a hollow taper post to hold against the filter element. An axial pipe of a connecting tube head is screwed to the axial inlet opening of the upper lid. The connecting tube head has a pressing ring to hold against a washer, providing a sealing function. Unfiltered fuel from an inlet end is filtered with the filter element and filtered fuel is expelled through an outlet end. It is easy and quick to assemble and disassemble the filter element.

2. Description of the Prior Art

There are two types of filter 6 on the market, one is unable to drain oily water and the other is able to drain oily water. The former includes a metallic container 61 to accommodate a filter element 62. The filter element 62 has an axial threaded trough 621 and an upper surface 622, as shown in FIG. 5. A rubber washer 611 is placed on the metallic container 61 to provide a sealing function for an inner air room when the connecting tube head is screwed to the filter element 62, as shown in FIG. 4-A. The latter is substantially similar to the former with the exceptions described hereinafter. The metallic container 61 is provided with a base 63 to store liquid. A drain valve 631 is screwed to the bottom of the base 63. The conventional filters have the following shortcomings:

(1) The former doesn't provide a device to drain oily water. It is necessary to replace a new one after a period of time.
(2) The metallic container is integrally formed with the filter element. It is required to replace the filter element along with the metallic container. This design is not cost-effective.

SUMMARY OF THE INVENTION

According to the present invention, there is provided a marine water separating fuel filter, comprising:

a connecting tube head having a number of outlets at respective sides thereof, one set of the outlets interconnecting with an axial pipe, the other outlets interconnecting with an upper room surrounded with a pressing ring;

an upper lid in a bottle cap shape having a threaded section around an inner wall thereof, a number of notches around an outer wall thereof, and a top, the top being formed with two grooves, a number of upper holes, an axial inlet opening in sequence toward inward, the axial inlet opening having an inner threaded section, the upper lid further comprising a washer having a lower end to hold against each the groove;

a filter element having a hollow filtering body; and a container having an opening facing upward and a number of ribs around an outer wall thereof, a threaded section and a circular engaging board being provided at an upper section of the container and a circular ring being provided on the engaging board, a hollow taper post extending upward from a central bottom of the container, an outlet protruding outward from the bottom of the container, the top of the hollow taper post being provided with a limiting ring, the outlet having an inner threaded section for connection of a drain valve, an indication ring being provided around the hollow taper post;

thereby, the filter element being accommodated in the container and sealed by the upper lid with the axial inlet opening and the limiting ring provided on the hollow taper post to hold against the filter element, the axial pipe of the connecting tube head being screwed to the axial inlet opening of the upper lid, the pressing ring holding against the washer to provide a sealing function, unfiltered fuel from an inlet end being filtered with the filter element to produce oily water stored in the container and filtered fuel flows through the upper holes into the upper room to be expelled through an outlet end, the indication ring floating on the oily water collected in the container, the indication ring being visible through the container to thereby indicate the height of the oily water.

It is the primary object of the present invention to provide a marine water separating fuel filter, which is easy and convenient to replace a filter element.

It is another object of the present invention to provide a marine water separating fuel filter, which is cost-effective.

It is a further object of the present invention to provide a marine water separating fuel filter, which provides an indication ring to clearly indicate the height of oily water collected in the container.

It is another further object of the present invention to provide a marine water separating fuel filter, which is adapted for various connection tube heads.

BRIEF DESCRIPTION OF THE DRAWINGS

FIG. 3-A is a partially enlarged view of FIG. 3;
FIG. 4-A is another perspective view of a connecting tube head of the present invention.

DETAILED DESCRIPTION OF THE INVENTION

Figure 1:
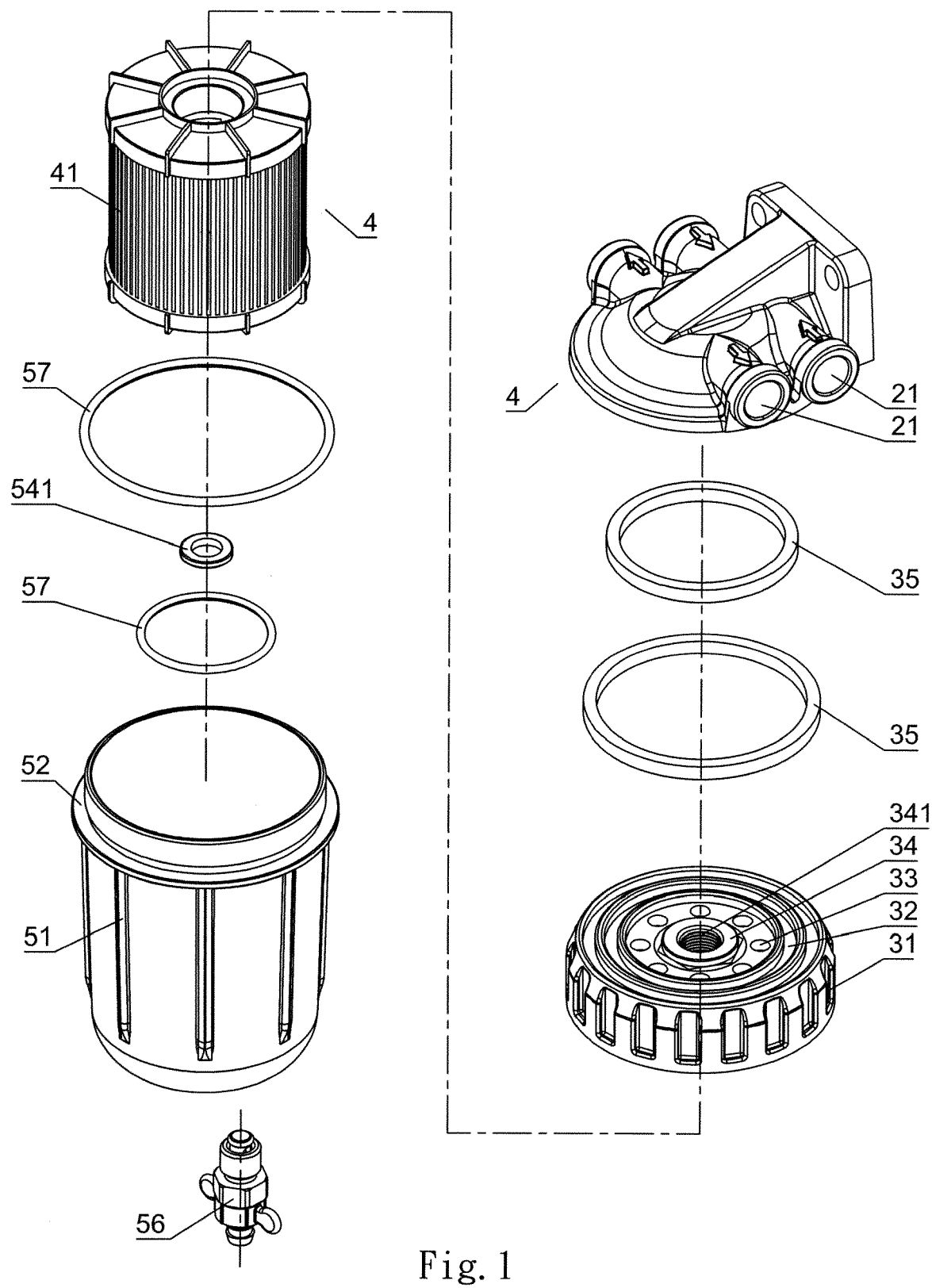
FIG. 1 is an exploded view of the present invention.
Figure 2:
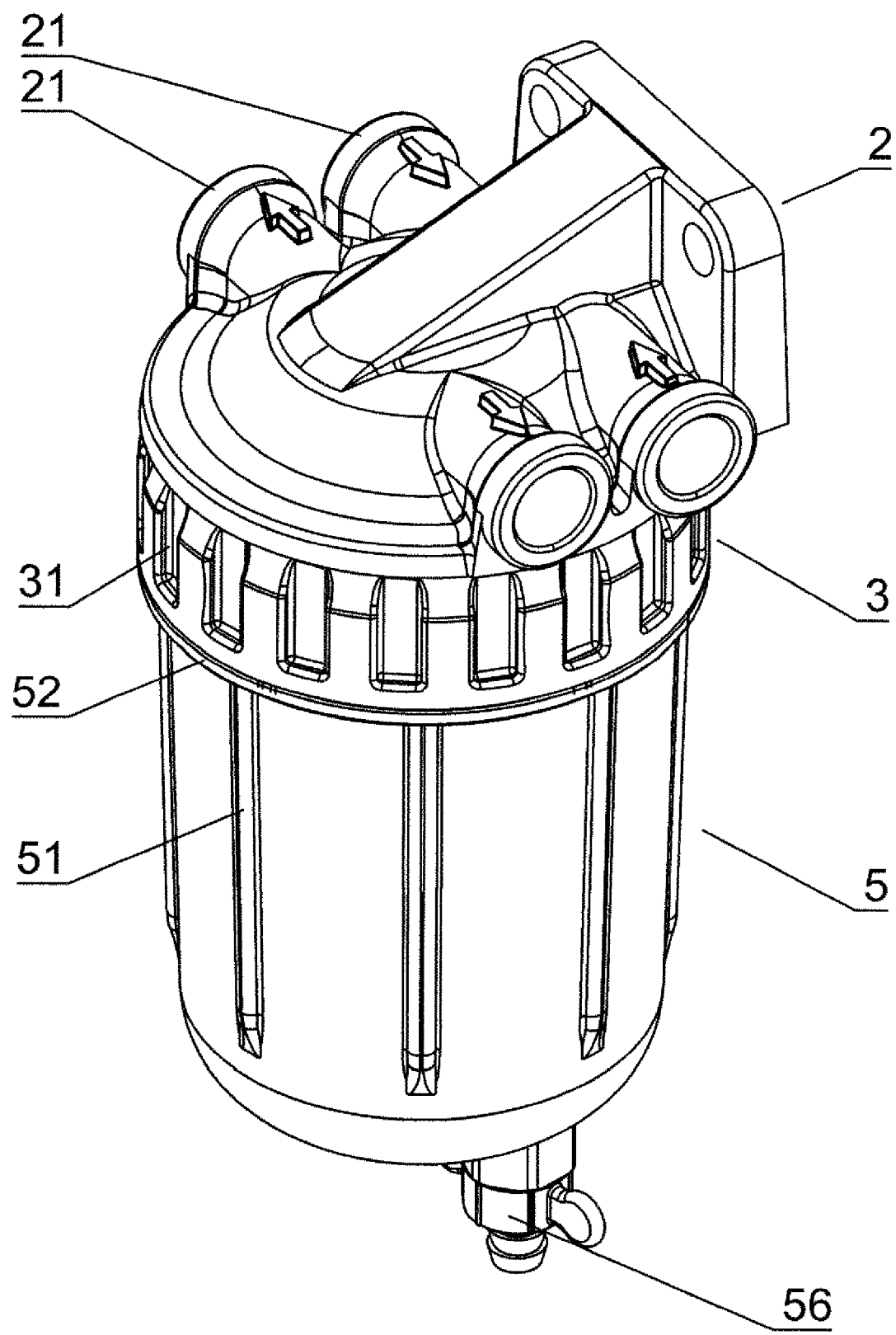
FIG. 2 is a perspective view of the present invention.
Figure 3:
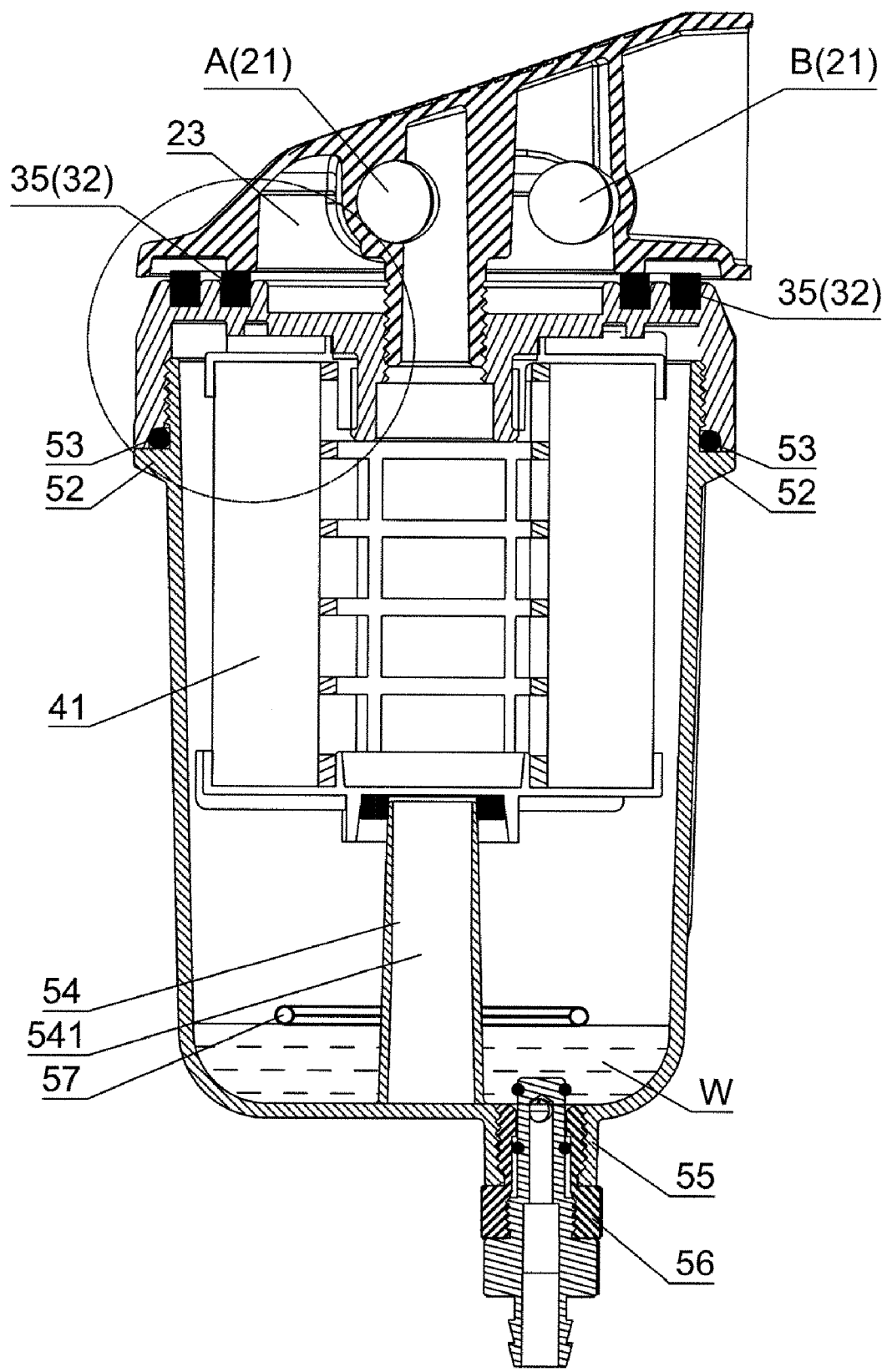
FIG. 3 is a cross-sectional view of the present invention.

As shown in FIGS. 1, 2, 3-A and 4-A, the present invention comprises a connecting tube head 2, an upper lid 3, a filter element 4, and a container 5.

Figure 4:
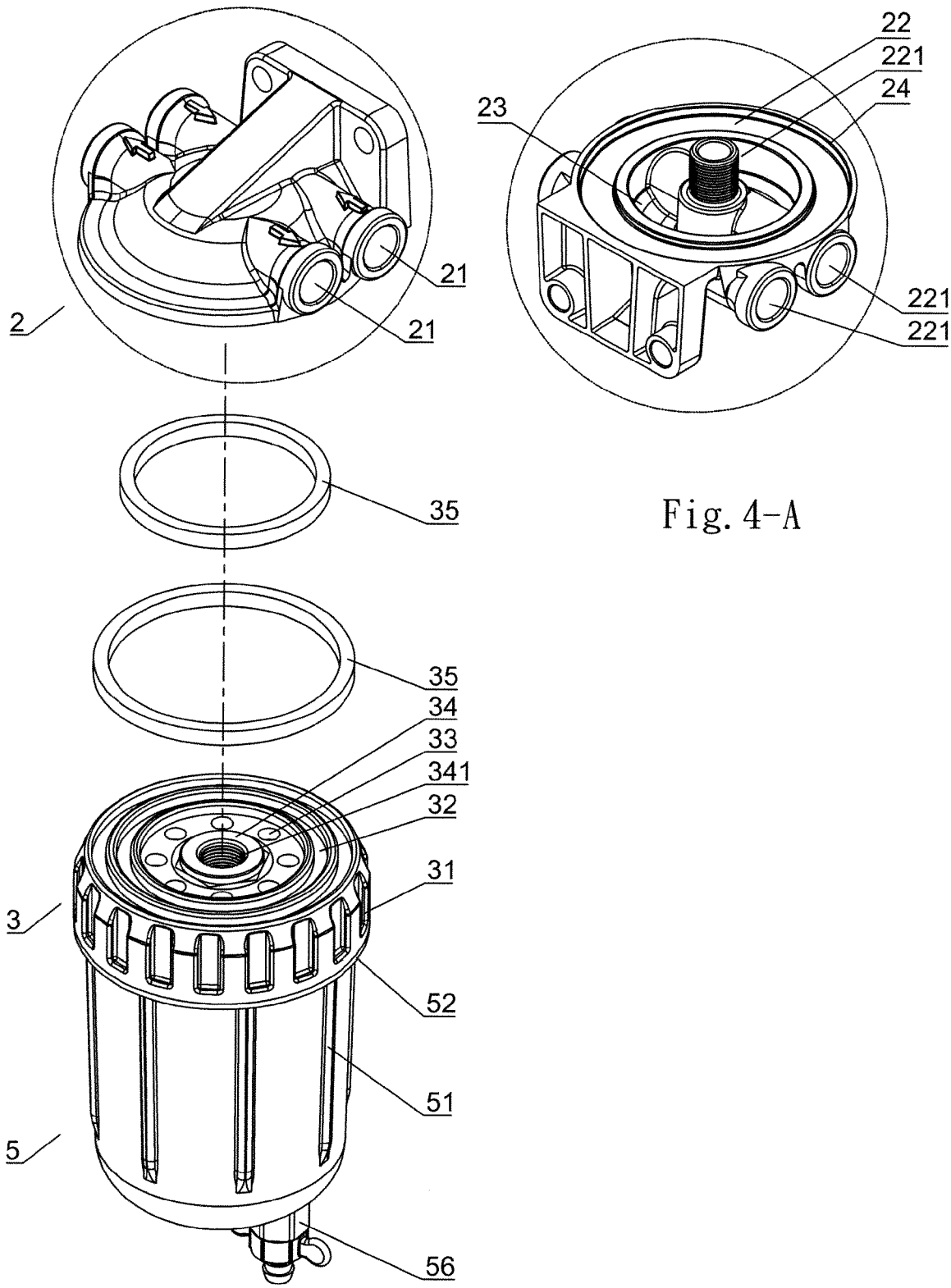
FIG. 4 is an exploded view according to a preferred embodiment of the present invention.
Figure 5:
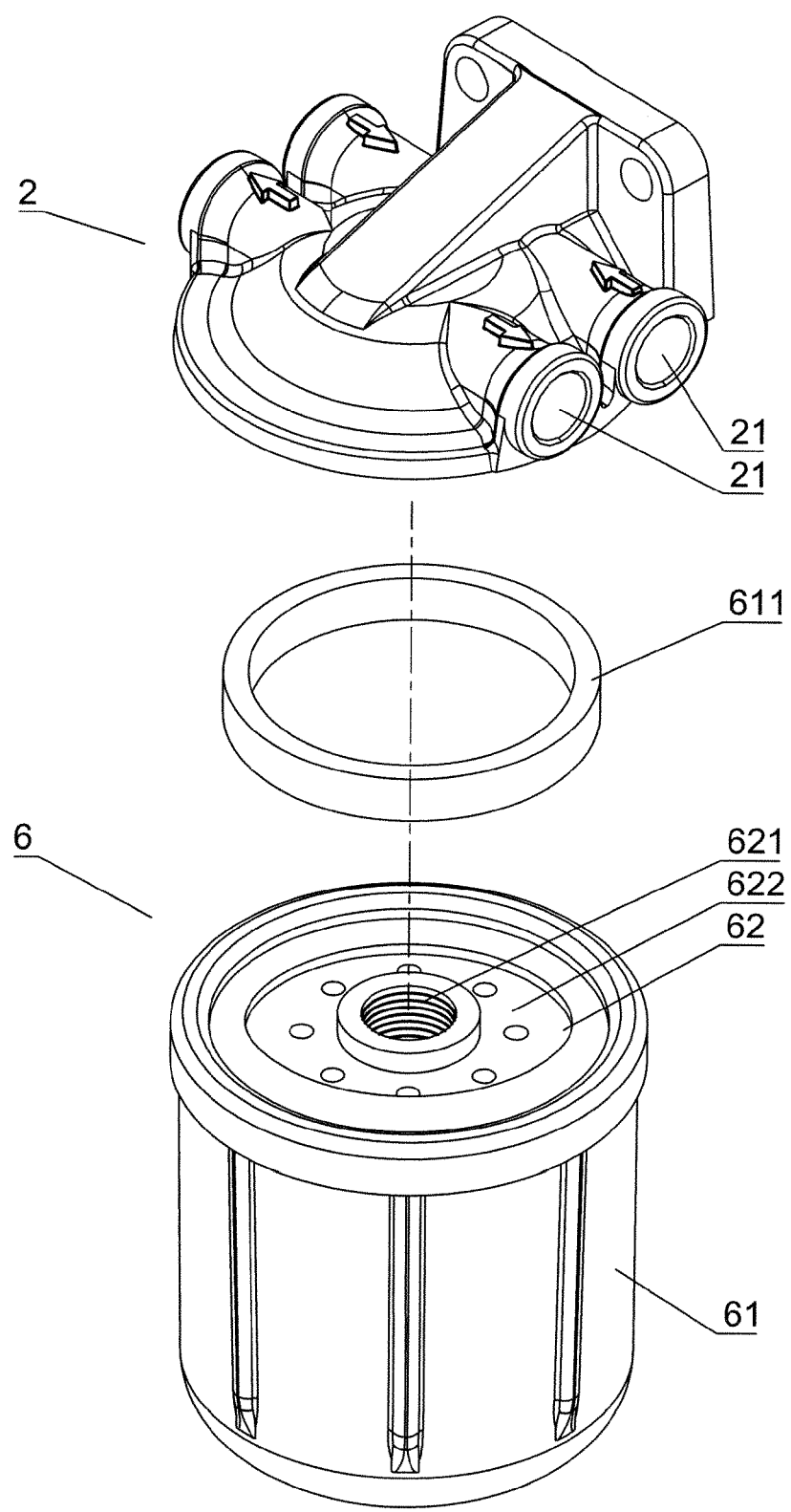
FIG. 5 is an exploded view of a conventional filter.
Figure 6:
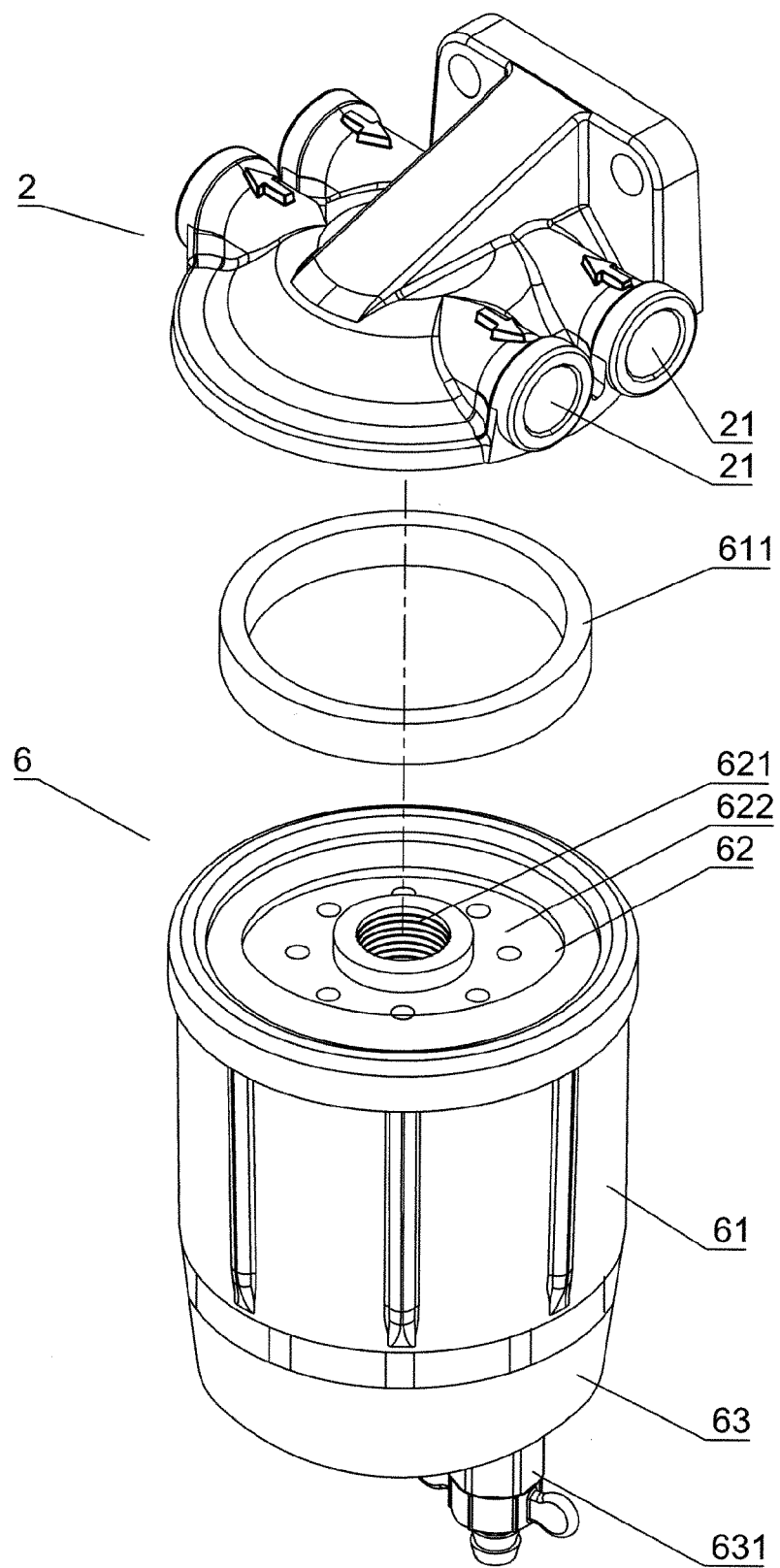
FIG. 6 is an exploded view of another conventional filter.

The connecting tube head 2 has a number of outlets 21 at respective sides thereof. One set of the outlets 21 interconnects with an axial pipe 22 for unfiltered fuel entering the filter element 4. The axial pipe 22 has an outer threaded section 221 at a lower end thereof. The other outlets 21 interconnect with an upper room 23, as shown in FIG. 4-A. The connecting tube head 2 has a pressing ring 24 around upper room 23 to engage with an upper end of a washer 35.

The upper lid 3 is in a bottle cap shape. The upper lid 3 has a threaded section around an inner wall thereof and a number of notches 31 or ribs around an outer wall for enhancing rotation of the upper lid 3. The top of the upper lid 3 is formed with two grooves 32, a number of upper holes 33, an axial inlet opening 34 in sequence toward inward. The grooves 32 are adapted to accommodate the washer 35. The upper holes 33 are adapted to expel filtered fuel. The axial inlet opening 34 has an inner threaded section 341 for connection of the axial pipe 22 of the connecting tube head 2 and extends into an upper central portion of the filter element 4.

The filter element 4 has a hollow filtering body 41. The upper central portion of the filter element 4 holds against the axial trough 34, and the lower central portion of the filter element 4 holds against a hollow taper post 54 of the container.

The container 5 is a hollow cylinder. The container 5 has an open facing upward and a number of notches or ribs 51 around an outer wall thereof for enhancing rotation of the container 5. A threaded section and a circular engaging board 51 are provided at an upper section of the container 5 and a circular ring 53 is provided on the engaging board 52 to engage with the upper lid 3. The hollow taper post 54 extends upward from the central bottom of the container 5. An outlet 55 protrudes outward from the bottom of the container 5. The top of the hollow taper post 54 is provided with a limiting ring 541 for placing the central bottom of the filter element 4. The outlet 55 has an inner threaded section for connection of a drain valve 56 to control drainage and storage of the oily water W. An indication ring 57 is provided on the hollow taper post 54 to indicate the height of the oily water W. The indication ring 57 may be a plastic ring or a rubber ring.

As shown in FIGS. 1, 3, 3-A and 4, the central bottom of the filter element 4 is placed on the limiting ring 541 of the hollow taper post 54. The axial trough 34 of the upper lid 3 extends into the filter element 4 and engages with the upper central portion of the filter element 4. The upper lid 3 is screwed to the threaded section at the upper section of the container 5, with the lower edge of the upper lid 3 engaging with the circular ring 53 to hold against the engaging board 52. The upper lid 3, the filter element 4 and the container 5 are sealed and assembled together to form a unit to be connected with the connecting tube head 2, as shown in FIG. 4. The axial rod 22 is screwed to the axial trough 34. The washer 35 holds against the pressing ring 24, as shown in FIG. 3-A, providing a sealing function. When the replacement of the filter element 4 is required, it is easy to rotate in an opposite direction to disassemble the upper lid 3 and the connecting tube head 2.

As shown in FIGS. 1 and 3, the outlet 21 interconnecting with the axial pipe 22 is defined as an inlet end A for the unfiltered fuel. Because the axial pipe 22 is screwed to the axial inlet opening 34, the unfiltered fuel direct enters the filter element 4. Furthermore, the container 5 and the upper lid 3 are sealed. The fuel is filtered through the filtering body 41 to produce oily water to be stored in the container 5, and the filtered fuel flows through the upper holes 33 into the upper room 23. The pressing ring 24 holds against the washer 35 to provide a sealing function. The outlets 21 interconnecting with the upper room 23 is defined as an outlet end B for filtered fuel. After a period of time, the filter element 4 is replaced simply to reuse the present invention. This design provides environmental and economical purposes.

As shown in FIGS. 1 and 3, when the oily water W rises, the indication ring 57 fitting onto the hollow taper post 54 will indicate the oily water level, preventing misjudgment due to the reflection or refraction of light. When the axial pipe 22 is screwed to the axial inlet opening 34, the two grooves 32 of the upper lid 3 may be applied to a different connecting tube head 2. The washer 35 is to hold against the pressing ring 24, providing a convenient way to connect with all kinds of connecting tube head 2.

According to the aforesaid, the present invention provides a screwed way to assemble the connecting tube head 2, the upper lid 3, the filter element 4 and the container 5, with the washer 35 holding against the circular ring 53 to provide a tightly seal.

Although the present invention has been shown and described with respect to the preferred embodiment, it will be understood by those skilled in the art that various changes and modifications may be made without departing from the spirit and scope of the invention as defined in the following claims.

What is claimed is:

1. A marine water separating fuel filter, comprising:
   a connecting tube head having a number of outlets at respective sides thereof, one set of the outlets interconnecting with an axial pipe, the other outlets interconnecting with an upper room surrounded with a pressing ring;
   an upper lid in a bottle cap shape having a threaded section around an inner wall thereof, a number of notches around an outer wall thereof, and a top, the top being formed with two grooves, a number of upper holes, an axial inlet opening in sequence toward inward, the axial inlet opening having an inner threaded section, the upper lid further comprising a washer having a lower end to hold against each the groove;
   a filter element having a hollow filtering body; and
   a container having an opening facing upward and a number of ribs around an outer wall thereof, a threaded section and a circular engaging board being provided at an upper section of the container and a circular ring being provided on the engaging board, a hollow taper post extending upward from a central bottom of the container, an outlet protruding outward from the bottom of the container, the top of the hollow taper post being provided with a limiting ring, the outlet having an inner threaded section for connection of a drain valve, an indication ring being provided around the hollow taper post;
   thereby, the filter element being accommodated in the container and sealed by the upper lid with the axial inlet opening and the limiting ring provided on the hollow taper post to hold against the filter element, the axial pipe of the connecting tube head being screwed to the axial inlet opening of the upper lid, the pressing ring holding against the washer to provide a sealing function, unfiltered fuel from an inlet end being filtered with the filter element to produce oily water stored in the container and filtered fuel flows through the upper holes into the upper room to be expelled through an outlet end, the indication ring floating on the oily water collected in the container, the indication ring being visible through the container to thereby indicate the height of the oily water.

2. The marine water separating fuel filter as claimed in claim 1, wherein the indication ring is either a plastic ring or a rubber ring.

\* \* \* \* \*